Patented Sept. 9, 1952

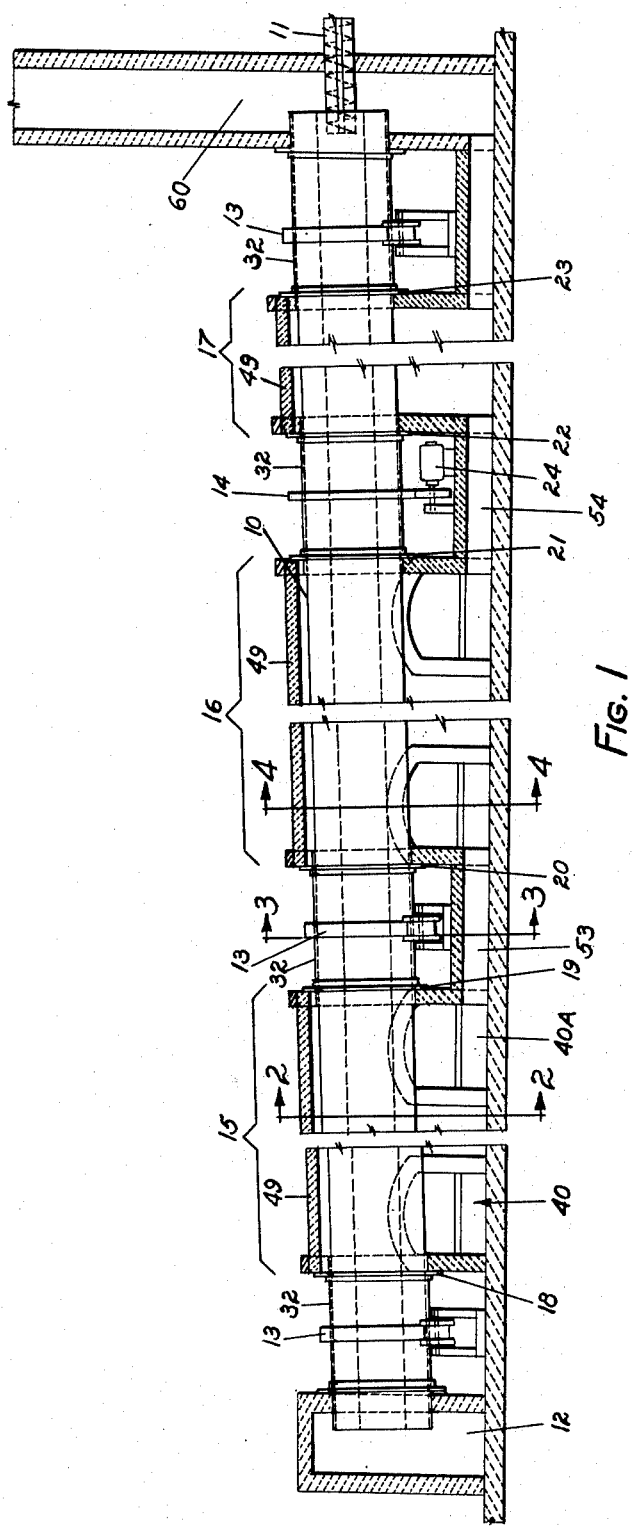

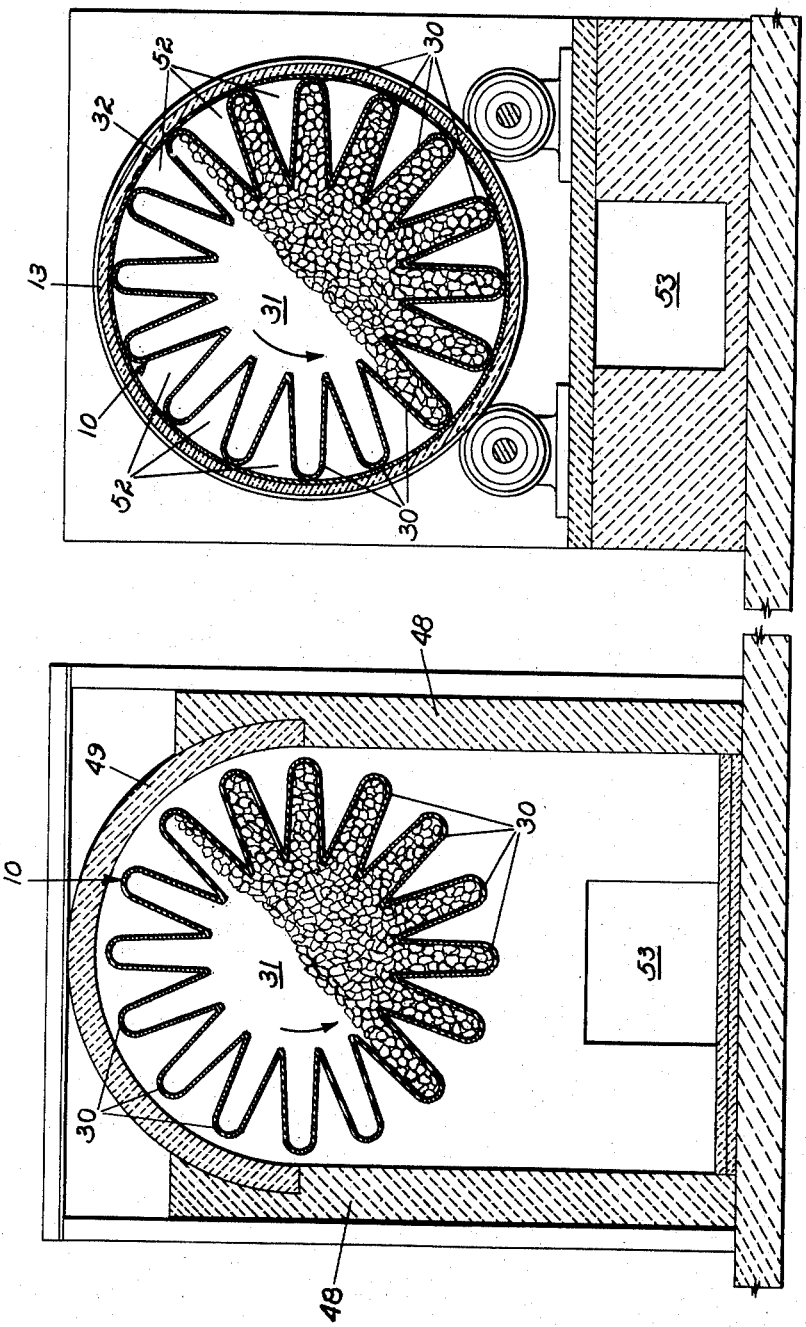

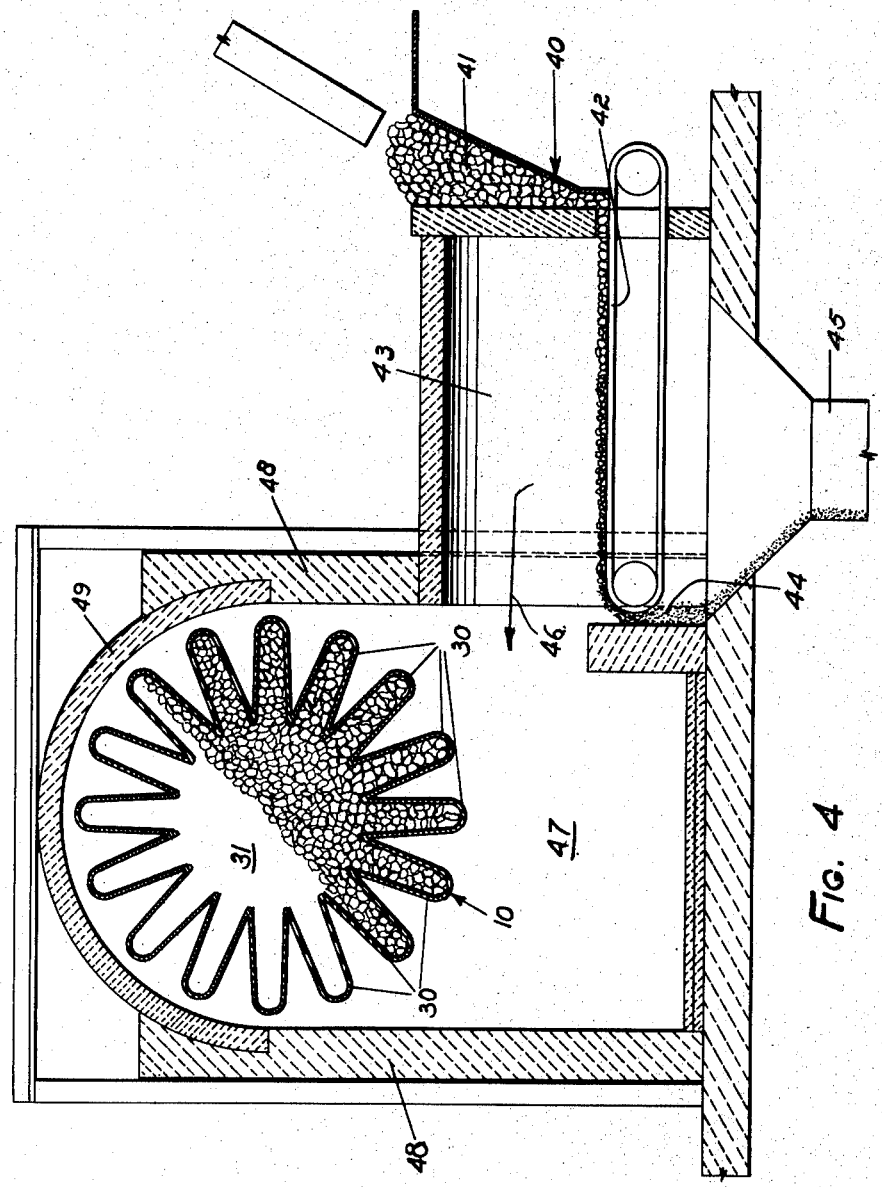

2,610,115

UNITED STATES PATENT OFFICE 2,610,115

METHOD FOR DEHYDRATING LIGNITE

Henry G. Lykken, Minneapolis, Minn.

Application September 30, 1948, Serial No. 52,008

1 Claim. (Cl. 44—33)

This invention relates to an improved method and apparatus for drying lignite and similar high moisture content lignitic fuels to produce a relatively moisture-free, stable and storable fuel.

Lignitic fuels contain from 25% to 40% moisture and when allowed to air dry or are dried by mere application of heat, such materials break down and disintegrate into high dust content materials. If any attempt is made to reduce the moisture content below 10% to 15% by ordinary drying, moisture will be reabsorbed. In addition, when so dried, such coals become unstable and are very susceptible to spontaneous ignition during storage. As a consequence the use of lignitic fuels has been limited to those instances in which special precautions are taken to store the material in small quantities or otherwise where the material is protected to prevent spontaneous ignition.

It is an object of the present invention to provide a method of treating lignite wherein the lignite is gradually deprived of its natural moisture and rendered more and more activated and absorptive and dry and simultaneously permitted to absorb and hold mineral hydrocarbon compounds.

It is also an object of the invention to provide a method of treating lignite to form a dust-free fuel of clean, bright appearance of low reactivity, free from slacking and free from spontaneous heat in bulk storage.

It is another object of the invention to provide a non-slacking water repellent activated lignite containing from about 3% to about 6% residual moisture, partially saturated with mineral hydrocarbons and having a surface coating of condensed mineral hydrocarbons, and more particularly to provide such a fuel wherein the mineral hydrocarbon content is in the range of about 3% to 7%.

It is another object of the invention to provide a method of treating lignite in an enclosed zone at substantially atmospheric pressure, in the presence of superheated steam generated from the natural moisture content of the lignite and in the presence of about 3% to 7% mineral hydrocarbons which are liquid at normal pressures and temperatures.

It is a further object of the invention to provide method and apparatus to dehydrate lignite in large-scale operations at low cost and with minimum heat and labor requirements.

Other and further objects of the invention are those inherent in the methods and apparatus herein illustrated, described and claimed.

The method of the invention is illustrated with reference to the drawings which illustrate novel apparatus in which Figure 1 is a side elevational view, partly in section;

Figure 2 is a sectional view taken along the lines 2—2 of Figure 1;

Figure 3 is a sectional view taken along the lines 3—3 of Figure 1; and

Figure 4 is a sectional view taken along the lines 4—4 of Figure 1.

Throughout the drawings corresponding numerals refer to the same parts.

In carrying out the invention, raw lignite, which has been graded as to size, is mixed with from 3% to less than 10% mineral hydrocarbon which is liquid at normal temperatures, and the mixture is heated gradually to a final temperature of approximately 300° F. As the mineral hydrocarbon there may be used low grade petroleum fractions, such as road oil, tar, asphaltum, bunker oil, pitch and the like which are liquid at ordinary temperatures or can be liquefied by slight heating. The mineral hydrocarbon is applied to the graded lignite by spraying or dripping and is sufficiently mixed so as to be distributed. The mixture of lignite and mineral hydrocarbon is heated in a treating zone having walls heated to a temperature much above the temperature of 300° F., to which the mixture is heated. The heat transfer media in the treating zone is a mixture of superheated steam generated from the moisture content of the lignite and hydrocarbon vapors generated from the added mineral, the superheated steam and hydrocarbon vapors being formed in situ by contact with the much hotter walls of the treating zone. The steam, which is generated in situ from the natural moisture of the lignite, is superheated by contact with the much hotter walls of the treating zone, and the mixture of superheated steam and superheated hydrocarbon vapors forms an effective heat transfer media which conveys heat from the walls of the treating zone to the solid portions of the mixture. In the heating zone arrangement is made so that all portions of the mixture and the vapors evolved therefrom are brought repeatedly into contact with the heating surface of the heating zone and heat is transferred to the solid material by contact and also by the action of the superheated vapors so formed.

As the lignite is heated to about 200° F. a large percentage of its natural moisture content is driven off and its carbon content becomes more and more activated and adsorptive of hydrocarbon gases. Hence, at about the temperature of about 200° F. and above, the hydrocarbon gases liberated by the heating action are adsorbed as liberated within the mass on an exchange basis with the liberated moisture. That is, as the temperature rises above 200° F. hydrocarbon vapors progressively replace the remaining moisture of the lignite mass as the temperature increases and the lignitic carbon becomes more and more activated and as more and more of the hydrocarbon is vaporized it is immediately adsorbed and held by the thus activated lignite. Penetration of the hydrocarbon entirely through the pieces of lignite is evident after a temperature of 200° F. is reached, and penetration increases as the temperature rises.

It does not appear that the exchange of hydrocarbon and moisture in the lignite is on a weight-for-weight basis, as a relatively small amount of the hydrocarbon is required, viz. from about 3% to less than 10%, preferably 3% to 7%, and an appreciable amount of the hydrocarbon remains on the surface of the final cooled product as a dry varnish-like covering. The adsorbed hydrocarbon vapor may be considered more as a partial saturation of the activated carbon's capacity to adsorb gases. The final product has a much lesser tendency to adsorb gases and oxygen particularly and to become heated thereby than lignitic carbon which is produced without hydrocarbon vapors being present during the heating period. The invention does not require a quantitative exchange of hydrocarbon for water on a weight basis but it is evident that the hydrocarbon does penetrate entirely through the pieces of finished lignitic fuel. As the temperature is brought up to about 300° F. some of the hydrocarbon vapors tend to leave the mass and I therefore limit the treatment to approximately 300° F. During the heat treating process the pressure is maintained at substantially atmospheric pressure and the evolved moisture vapors are permitted to escape from the treating zone. During the entire treating period up to a temperature of about 300° F. there is substantially no loss of hydrocarbon vapors along with the evolved moisture.

The product is discharged from the treating zone when the temperature has been brought to approximately 300° F. throughout the mass of each particle treated. It is the object to obtain heat penetration and a temperature of about 300° F. through all portions of each particle, although no exact control is required to determine penetration for each individual particle. The heating is considered to be sufficiently uniform when particles of relatively uniform size are treated and when, by test of the final product, it is determined that on an average given size particles have been heated to a temperature of approximately 300° F. on the interior of each particle, and when by test the moisture content of the finished product is in the range of 3% to 6%.

The resultant lignite fuel has an exceedingly low moisture content ranging from about 3% to 6% residual moisture content. The total content of hydrocarbon in the final product is not substantially less percentagewise than that initially added to the batch and ranges from 3% to less than 10%, preferably 3% to 7%.

The final product is a non-slacking water repellent activated lignite which is free from heating during bulk storage. It has a smooth, somewhat glossy, deep brownish-black appearance and has easy flowability so that it can be handled through bins, chutes, stokers and the like, with ease. It has a calorific value ranging from 12,000 to 12,500 B. t. u. per pound.

It is contemplated and claimed as a part of the instant invention that the hydrocarbon may be added to the raw lignite in percentages in excess of that retained in the final product and the excess hydrocarbon driven off as vapor, together with the volatilized moisture of the lignite. This mode of operation is particularly adaptable to those situations in which the hydrocarbon may contain relatively large percentages of lower boiling constituents or where it is desired to produce a very low moisture content final product. When so operated the excess hydrocarbons are condensed by passing the mixture of volatilized moisture and hydrocarbon vapors through a suitable condenser wherein the moisture vapors are converted to the liquid water and the hydrogen vapors converted to liquid hydrocarbons. The water is then separated from the liquid hydrocarbons and the latter sold or returned to the inflowing material at the start of the process. Any conventional condenser may be employed for thus condensing the moisture-hydrocarbon vapors, and any suitable water-oil separator may be utilized for separating the liquid hydrocarbons from the condensed water.

In such case more hydrocarbon is added than is retained in the product. This method of operation is adapted for higher temperatures of operation, in excess of about 300° F., where it is desirable to reduce the moisture content of the final product to an irreducible minimum. In this higher temperature mode of operation there may also be used a wider range of hydrocarbons, particularly those containing lower boiling fractions.

Referring to the drawings, particularly Figure 1, there is illustrated a tube furnace which may be utilized for carrying out the heat treatment steps of the invention wherein the inclined tube generally designated 10 is the heating chamber through which the lignite is progressed from a feeding screw or other feeding device 11 to the discharge hopper 12. Tube 10 is composed of a plurality of outwardly extending folds or convolutions 30 which extend from end to end of the tube. The convolutions or folds 30 form inwardly extending pockets or channels and as joined together, as shown in Figures 2, 3 and 4, they also form a central open space 31. The extended exterior and interior surface of the convolutions 30—30 greatly facilitate heat transfer.

The tube 11 is supported upon an inclined axis by means of a plurality of roller mountings 13, and the tube is arranged to be rotated in its mountings by means of a bull-gear 14 driven by a suitable gear motor or other variable speed driving arrangement 24. The rotation of the tube is very slow and the rate of rotation can be varied. At separated intervals along the length of the tube there are provided heating chambers. Thus, throughout that portion of its length under the bracket 15 the tube is enclosed in one heating chamber. Likewise, throughout that portion of the tube under the bracket 16, the tube is enclosed in another heating chamber and similarly, throughout that portion of its length under the bracket 17, the tube is enclosed in a third heating chamber. Each of these heating chambers 15, 16 and 17 may be of the same or different lengths, depending upon the design and construction of the drier but are preferably made of approximately the same lengths. Each of the heating chambers 15, 16 and 17 is enclosed and is provided with a rotary seal at each end as indicated at 18, 19, 20, 21, 22 and 23.

Between the heating zones 15, 16 and 17 the tube 10 is enclosed by a cylindrical shell portion 32 against which the seals 18—19, 20—21 and 22—23 fit. At least several of the heating zones 15, 16 and 17 are provided with a suitable combustion apparatus which is preferably a chain grate burner of the type shown in Figure 4 at 40. The burner is provided with a hopper 41 into which low-grade fuel available at the mine may be introduced and carried by means of the chain grate 42 into the combustion zone 43 where it is burned at high temperatures. The ashes from the chain grate are discharged at 44 and into the discharge hopper 45. The hot combustion gases pass in the direction of arrows 46 into the zone 47 under the tube 10, which is accordingly heated to a high temperature. Each of the combustion zones is enclosed by means of brick-work walls 48 and a brick arch 49 and end walls through which the tube passes and therefore wholly encloses the tube 10 throughout that portion of its length indicated by the brackets 15, 16 or 17. The heating zones 15, 16 and 17 may have one, but preferably have several heating grates, thus as illustrated at 40 and 40A for heating zone 15. The remaining heating zones may likewise have several grates, although usually the last in the series, viz. zone 17 is sufficiently heated by the earlier grates in the system.

Between the heating zones the hot flue gases pass around the exterior of the deep convolutions 30 and between them and the shell 32 in the spaces designated 52 in Figure 3. Since these spaces do not usually provide a sufficient area for all of the heating gases to pass through, there is provided a by-pass channel 53 between the heating zones 15 and 16 and a similar by-pass channel 54 between the heating zones 16 and 17. It will be noted that the heating zone 17 is not provided with heating grates, and therefore the heat which is supplied to it is by means of the channel 54 and through the channel 52 under the shell 32 in that space between the heating zones 16 and 17.

Any suitable heating apparatus, such as powdered fuel burners, may be used for heating the exterior of the tube 10. The shell walls of tube 10 should be heated to a temperature of 800°–1500° F.

Any suitable apparatus is used for crushing and sizing the crushed lignite. The mineral hydrocarbon is then applied by spraying or dripping on the above stated amount and the lignite-hydrocarbon mixture is then fed into the elevated end of the tube by means of the feed screw 11 or other suitable feeding device which passes through the flue 60. The lignite thus discharged into the interior of the tube 10 flows into the deep pockets 30 where it is heated by contact with the exterior hot shell forming the pockets. The initial reaction is the generation of steam by the heat which gradually penetrates into the particles and volatilizes the natural moisture. The steam emanating from the particles itself flows into contact with the much hotter interior surface of the pockets 30 and becomes superheated and the superheated steam then in turn transfers heat to other particles which may not be in direct contact with the shell. As the tube 10 is rotated the finished lignite product is gradually discharged from the uppermost pockets and into the interior space 31 and from it gently rolls into the lower pockets. Thus, the lignite is rolled over and over on itself and is driven into the pockets 30 and subsequently discharged therefrom. As a result the heat flow into the particles is very efficient. It may be noted that lignite-mineral hydrocarbon mixture has a very favorable rolling and flowing characteristic and resists abrasion and dust formation. Any dust that is formed is held by the hydrocarbon and is thus saved. The steam which is volatilized as a result of the heating passes through the interior space 31 and through the area of the uppermost and unloaded pockets in the tube 30 and migrates to the upper end of the tube and thence discharges into the flue 60 where it escapes. The lignite in the meantime gradually migrates down the inclined tube 10 and discharges into the discharge hopper 12 from which it is withdrawn by any suitable mechanical device or may be chuted directly into bins or railroad cars.

The rate of rotation of the tube 10 and the inclination thereof are adjusted so that for a given particle size of lignite, the rate of heat penetration into the particle will be such that the interior of practically all of the particles will be heated to approximately 300° F. by the time the lignite particle has traveled through the tube and reached the lowermost end of the tube. It does no harm to hold the lignite particles at approximately 300° F., nor is there any great disadvantage should some of the lignite particles be heated to somewhat over 300° F. When heated above 300° F., evolution of hydrocarbon volatiles begins, although much less than would be supposed from the volatilizing temperatures of the various hydrocarbon constituents in the hydrocarbon that is added. This is due to the powerful adsorbing effect of the lignite char which is produced during the operation. However, for best results I prefer to operate at such a rate that the interior portions of substantially all of the particles will reach approximately 300° F. just before being discharged.

As many apparently widely different embodiments of this invention may be made without departing from the spirit and scope thereof, it is to be understood that I do not limit myself to the specific embodiments herein.

What I claim is:

A continuous process of producing a low moisture content lignite-mineral hydrocarbon fuel comprising a solid fuel composed of lignite particles and fines and a mineral hydrocarbon binder therefor, said solid fuel characterized by being dust-free, slack-resistant and having a smooth abrasion-resistant surface which comprises the steps of crushing natural lignite; screening said lignite to a size not substantially exceeding 1 inch mesh; mixing therewith about 3 to 10% of the weight of the lignite, dry basis, of a mineral hydrocarbon oil; passing the mixture into a heating zone to heat the mixture to a temperature of about 300° F.; rolling the particles of said mixture upon themselves in said heating zone until the moisture content of said particles is from about 3 to 6%; bonding the lignite fines present in the screened lignite and produced during said heating and rolling operation to said lignite particles with said mineral hydrocarbon oil; removing the lignite-mineral hydrocarbon fuel particles from said heating zone; and cooling said fuel particles.

HENRY G. LYKKEN.

REFERENCES CITED

The following references are of record in the file of this patent:

UNITED STATES PATENTS

| Number | Name | Date |
|---|---|---|
| 953,633 | Willson | Mar. 29, 1910 |
| 1,047,969 | Mertens | Dec. 24, 1912 |
| 1,085,126 | Hoover et al. | Jan. 27, 1914 |
| 1,474,940 | Perkins | Nov. 20, 1923 |
| 1,508,617 | Schoch | Sept. 16, 1924 |
| 1,860,890 | Gallsworthy | May 31, 1932 |
| 2,183,924 | Schoch | Dec. 19, 1939 |